United States Patent [19]

Barcza

[11] Patent Number: 5,239,815

[45] Date of Patent: Aug. 31, 1993

[54] SYNC-RING ASSEMBLY FOR A GAS TURBINE ENGINE EXHAUST NOZZLE

[75] Inventor: William K. Barcza, Stuart, Fla.

[73] Assignee: United Technologies Corporation, Hartford, Conn.

[21] Appl. No.: 763,689

[22] Filed: Sep. 23, 1991

[51] Int. Cl.⁵ .................. F02K 1/00; F02K 1/54
[52] U.S. Cl. ..................... 60/228; 60/230; 60/271; 239/265.35
[58] Field of Search ........... 60/228, 230, 232, 271; 239/265.35, 265.41, 265.39

[56] References Cited

U.S. PATENT DOCUMENTS

| 3,658,253 | 4/1972 | Steffen ................... 239/265.39 |
| 3,814,325 | 6/1974 | McCardle, Jr. et al. ......... 60/271 |
| 3,988,889 | 11/1976 | Chamay et al. ............. 239/265.39 |
| 4,141,501 | 2/1979 | Nightingale ............... 239/265.39 |
| 5,082,182 | 1/1992 | Bruchez, Jr. et al. .......... 60/230 |

Primary Examiner—Richard A. Bertsch
Assistant Examiner—Howard R. Richman

[57] ABSTRACT

A sync-ring assembly for use on a axisymmetric gas turbine exhaust nozzle, the sync-ring having a semi-spherical outward surface received within and slidably contacting the cylindrical inner surface of a liner. The sync-ring runs along guide tracks mounted to the case of the nozzle, and is positioned along the liner and rotated with respect to the liner by a plurality of actuators pivotably connected to the sync-ring.

5 Claims, 3 Drawing Sheets

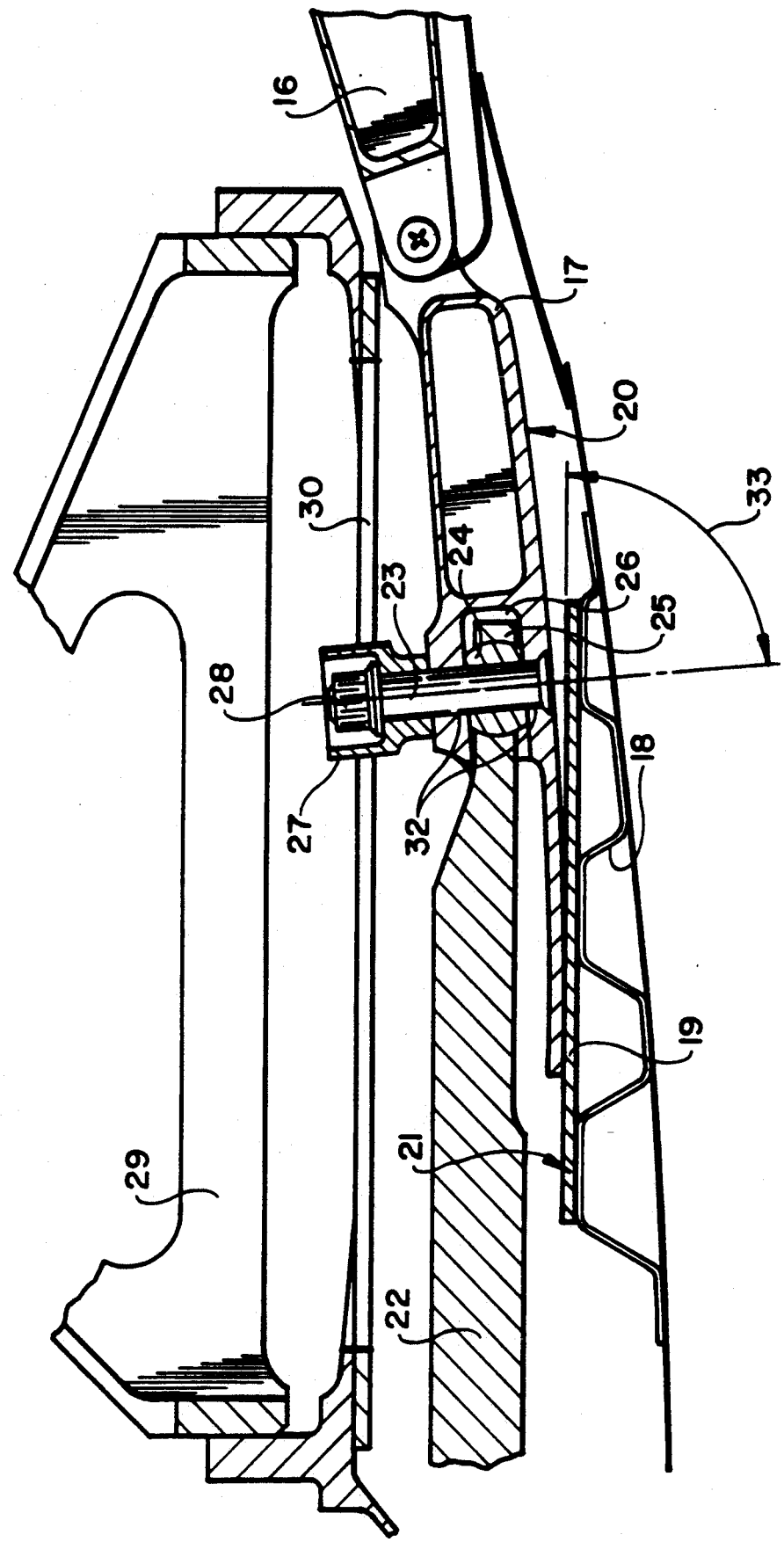

SYNC-RING ASSEMBLY FOR A GAS TURBINE ENGINE EXHAUST NOZZLE

TECHNICAL FIELD

This invention relates to synchronous control rings on axisymmetric exhaust nozzles for gas turbine engines.

BACKGROUND ART

One of the goals of designers of high performance gas turbine aircraft engines has been to achieve thrust vectoring exhaust nozzles. While this goal has somewhat been achieved through the use of "two-dimensional" nozzles, such nozzles are substantially heavier and more expensive than the variable exit area axisymmetric nozzles that they are intended to replace. However, heretofore designers have been unable to produce thrust vectoring from an axisymmetric exhaust nozzle without significantly increasing the cost and weight of the axisymmetric nozzle, as well as the complexity thereof.

What is needed is a mechanism to provide thrust vectoring for an axisymmetric exhaust nozzle.

DISCLOSURE OF THE INVENTION

According to the present invention, the foregoing and other objects are attained by providing a sync-ring assembly in which the sync-ring is selectively positionable within a cylindrical inner surface of a liner by a plurality of actuators, thereby providing both symmetric and asymmetric movement of the sync-ring. Variable exit area is provided by symmetrically actuating the actuators, thereby symmetrically displacing the sync-ring axially along the cylindrical inner surface of the liner. Thrust vectoring is provided by asymmetric actuation of the actuators, thereby asymmetrically displacing, or rotating, the sync-ring within the liner.

The foregoing and other features and advantages of the present invention will become more apparent from the following description and accompanying drawings.

BRIEF DESCRIPTION OF THE DRAWINGS

FIG. 3 is the sectional view shown in FIG. 2 with the sync-ring in the rotated position.

BEST MODE FOR CARRYING OUT THE INVENTION

Figure 1:
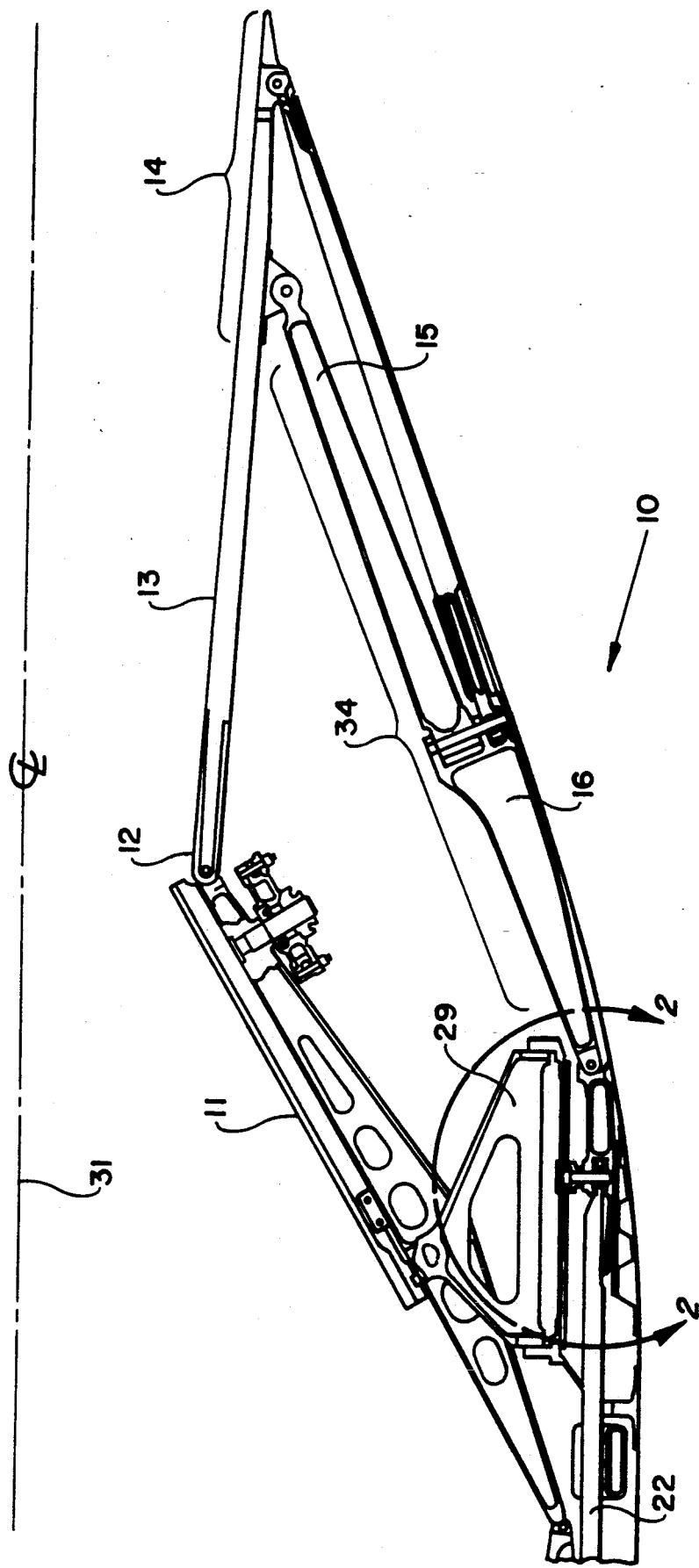
FIG. 1 is a cross-sectional view of a gas turbine exhaust nozzle incorporating the sync-ring assembly of the present invention.

FIG. 1 shows a sectional view of an axisymmetric exhaust nozzle 10 incorporating the present invention. The nozzle 10 includes a convergent flap 11 pivotably connected to the forward section 12 of the divergent flap 13. The aftward section 14 of each divergent flap 13 is connected to the sync-ring 17 by a positioning strut assembly 34 including a support strut 15 which is pivotably connected to a divergent flap positioning strut 16. The aft end of the support strut 15 is pivotably connected to the aftward section 14 of the divergent flap 13.

Figure 2:
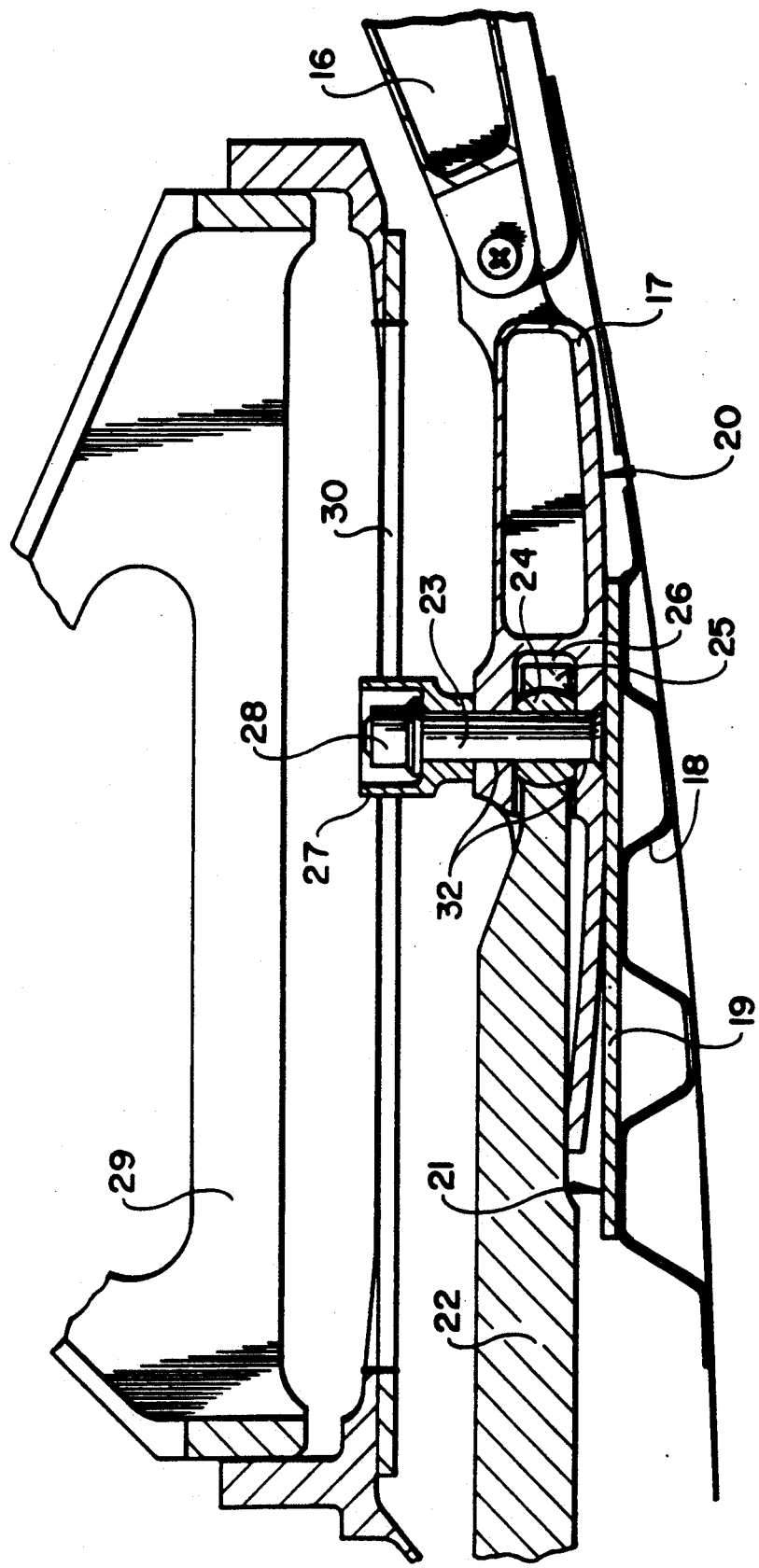
FIG. 2 is an enlarged view of the area of FIG. 1 bounded by line 2—2.

As shown in FIG. 2, the divergent flap positioning strut 16 of the positioning strut assembly 34 is pivotably connected to the semi-spherical sync-ring 17. As used herein, the phrase "semi-spherical sync-ring" means a synchronous divergent flap control ring of the type well known in the art which has an outward facing surface defined by points which are all equidistant from the center of the sync-ring. The nozzle case 18 includes a liner 19 preferably made of a wear-resistant composite material.

The sync-ring 17 has at least three shaft bores 32 equally spaced about the circumference of the sync-ring 17. The semi-spherical surface 20 of the sync-ring 17 rests on the cylindrical inner surface 21 of the liner 19. The sync-ring 17 is selectively positioned within the cylindrical liner 19 by a plurality of actuators 22, only one of which is shown in the figures. Each actuator 22 is connected to the sync-ring 17 by a shaft pin 23 which extends through one of the shaft bores 32 and a spherical bearing 24 in one end 25 of the actuator 22. The bearing cavity 26 in the sync-ring 17 in which the spherical bearing is received is somewhat larger than the actuator end 25 so that the angle between the shaft pin 23 and the actuator 22 can be varied by at least 5° and preferably 10° without causing interference between the actuator end 25 and the sync-ring 17.

A roller bearing 27 is rotatably mounted on each shaft pin 23 radially inward of the sync-ring 17. The roller bearing 27 is prevented from sliding off the radially inward end of the shaft pin 23 by a pin cap 28 which is secured to the end of the shaft pin 23. Each roller bearing 27 extends into a structural support 29 mounted to the nozzle case 18. Each support 29 has a guide track 30 oriented so as to guide the roller bearing 27 therein axially along the nozzle case 18.

Referring again to FIG. 1, by incorporating three or more individually controlled actuators 22 equally spaced around the circumference of the nozzle 10, the sync-ring 17 can be selectively positioned axially by equal actuation of the actuators 22, as in the case of standard axisymmetric nozzles. In addition, the sync-ring 17 can also be selectively rotated, or tilted, as shown in FIG. 3 by unequal actuation of the actuators 22, such that at least one of the shaft pins 23 is at an acute angle 33 to the cylindrical inner surface 21 radially outward therefrom. In this tilted position, at least one of the shaft pins 23 is positioned forward of at least one of the remaining shaft pins 23.

As those skilled in the art will readily appreciate, the present invention can vary both nozzle exit area and the angle of thrust vectoring. For example, if it is desirable to increase the exit area of the nozzle 10 shown in FIG. 1, uniform retraction of each of the actuators 22 causes the sync-ring 17 to slide forward along the liner 19 guided by the roller bearings 27. So long as the force produced by the actuators 22 on the sync-ring 17 is circumferentially symmetric, the sync-ring 17 is restricted to translational motion along the centerline 31 of the nozzle 10. Since the aft portion 14 of the divergent flap 13 is connected to the sync-ring 17 through the support strut 15 and the divergent flap positioning strut 16, the forward motion of the sync-ring 17 causes the aft portion 14 of the divergent flap to move radially outward from the centerline 31 thus increasing the exhaust nozzle exit area.

To obtain vectored thrust, at least one of the actuators 22 is extended or retracted more than that of the remaining actuators 22. This non-uniform action of the actuators 22 causes the sync-ring 17 to tilt about its spherical center. As those skilled in the art will readily appreciate, such tilting causes the aftward portion of some of the divergent flaps to move radially outward from the centerline 31 while at the same time causing the aftward portion 14 of radially opposed divergent flaps 13 to move toward the centerline 31. The resulting flap configuration deflects the exhaust gas from the centerline 31, thereby producing vectored thrust. Although this invention has been shown and described with respect to a detailed embodiment thereof, it will be understood by those skilled in the art that various changes in form and detail thereof may be made without departing from the spirit and scope of the claimed invention.

I claim:

1. A sync-ring assembly for selectively positioning divergent flaps of a gas turbine engine exhaust nozzle relative to the exhaust nozzle's case, said nozzle having a centerline defined therethrough, said assembly comprising:

a sync-ring pivotably connected to the divergent flaps by a plurality of positioning strut assemblies, said sync-ring having a first surface and a second surface radially outward of said first surface relative to said centerline, said second surface is semi-spherical, a plurality of shaft bores equally spaced about the circumference of the sync-ring, each shaft bore extending through said sync-ring between said first surface and said second surface, a liner having a cylindrical surface, said liner made of a wear resistant composite material and received within and supported by the nozzle case, said cylindrical surface slidably contacting the semi-spherical second surface, a plurality of shaft pins, each shaft pin extending through one of the shaft bores and protruding from the first surface, and each shaft pin pivotably connected to actuator means mounted to the nozzle case for selectively positioning the sync-ring relative to the nozzle case, and a plurality of supports mounted to the nozzle case, each support having a guide track therein; and, a plurality of roller bearings, each roller bearing rotatably mounted to one of the shaft pins, each bearing extending into one of said guide tracks;

wherein said sync-ring is selectively rotatable between a first position in which all of the shaft pins are perpendicular to the cylindrical surface radially outward therefrom relative to said centerline, and a second position in which at least one of the shaft pins is at an angle of at least 5° to the cylindrical surface radially outward therefrom relative to said centerline, and said sync-ring is selectively positionable along a portion of the cylindrical surface.

2. A sync-ring assembly for selectively positioning divergent flaps of a gas turbine engine exhaust nozzle relative to the exhaust nozzle's case, said nozzle having a centerline defined therethrough, said assembly comprising:

a sync-ring pivotably connected to the divergent flaps by a plurality of positioning strut assemblies, said sync-ring including
   a first surface, and
   a semi-spherical second surface radially outward of said first surface relative to said centerline;
   a liner having a cylindrical surface, said liner received within and supported by the nozzle case, said sync-ring received within the liner, and said cylindrical surface slidably contacting the semi-spherical second surface; and,
   means for selectively translating and rotating the sync-ring relative to the liner.

3. The sync-ring assembly of claim 1 wherein the means for selectively translating and rotating the sync-ring relative to the liner comprise:

a plurality of shaft bores extending from said first surface to said semi-spherical second surface;
   a plurality of supports mounted to the nozzle case, each support having a guide track therein;
   a plurality of shaft pins, each shaft pin extending through one of the shaft bores and protruding from the first surface, each shaft pin pivotably connected to actuator means mounted to the nozzle case; and,
   a plurality of bearings, each bearing rotatably mounted to one of the shaft pins, each bearing extending into one of said guide tracks.

4. The sync-ring assembly of claim 2 wherein the sync-ring is selectively positionable along a portion of the cylindrical surface by said actuator means.

5. The sync-ring assembly of claim 4 wherein the liner is made of a composite, wear resistant material.

* * * * *

UNITED STATES PATENT AND TRADEMARK OFFICE
CERTIFICATE OF CORRECTION

PATENT NO. : 5,239,815
DATED : August 31, 1993
INVENTOR(S) : William K. Barcza

It is certified that error appears in the above-identified patent and that said Letters Patent is hereby corrected as shown below:

Column 4, line 26, claim 3, change "claim 1" to --claim 2--.
Column 4, line 40, claim 4, change "claim 2" to --claim 3--.

Signed and Sealed this

Fifth Day of July, 1994

Attest:

BRUCE LEHMAN

Attesting Officer

Commissioner of Patents and Trademarks